US008966921B2

(12) United States Patent
Nazário et al.

(10) Patent No.: US 8,966,921 B2
(45) Date of Patent: Mar. 3, 2015

(54) VEHICLE-CABIN AIR-CONDITIONING SYSTEM AND A MODULE CONTAINING THE SYSTEM

(75) Inventors: Marcelo Christêllo Nazário, Joinville SC (BR); Maicon Jarschel, Joinville SC (BR); Ernani Pautasso Nunes Junior, Joinville SC (BR)

(73) Assignee: Behr Brasil Ltda., Sao Paulo (BR)

( * ) Notice: Subject to any disclaimer, the term of this patent is extended or adjusted under 35 U.S.C. 154(b) by 1196 days.

(21) Appl. No.: 12/740,855

(22) PCT Filed: Oct. 30, 2008

(86) PCT No.: PCT/BR2008/000330
§ 371 (c)(1),
(2), (4) Date: Sep. 8, 2010

(87) PCT Pub. No.: WO2009/055891
PCT Pub. Date: May 7, 2009

(65) Prior Publication Data
US 2011/0005248 A1 Jan. 13, 2011

(30) Foreign Application Priority Data
Oct. 30, 2007 (BR) ..................................... 0705494

(51) Int. Cl.
*B60H 1/32* (2006.01)
*F25D 17/04* (2006.01)
*F25B 47/00* (2006.01)
*B60H 1/00* (2006.01)
*B60H 1/24* (2006.01)

(52) U.S. Cl.
CPC ............ *B60H 1/00471* (2013.01); *B60H 1/245* (2013.01); *B60H 1/3233* (2013.01)
USPC .................. 62/239; 62/186; 62/277; 165/204

(58) Field of Classification Search
CPC ... B60H 1/00471; B60H 1/245; B60H 1/3233
USPC ............................ 62/186, 239, 277; 165/204
See application file for complete search history.

(56) References Cited

U.S. PATENT DOCUMENTS

| | | | | |
|---|---|---|---|---|
| 2,309,224 A | * | 1/1943 | Terry et al. ...................... | 62/186 |
| 2,405,411 A | * | 8/1946 | Dybvig ............................. | 62/89 |
| 2,986,016 A | * | 5/1961 | Gillham et al. ................. | 62/161 |

(Continued)

FOREIGN PATENT DOCUMENTS

| DE | 20 2005 000 560 U1 | 6/2006 |
|---|---|---|
| WO | WO 2007/042065 A1 | 4/2007 |

OTHER PUBLICATIONS

International Search Report mailed Jan. 27, 2009 for International application No. PCT/BR2008/000330.

(Continued)

*Primary Examiner* — Cassey D Bauer
*Assistant Examiner* — Henry Crenshaw
(74) *Attorney, Agent, or Firm* — Fay Sharpe LLP

(57) ABSTRACT

The present invention relates to a compact air conditioning system (1) for a vehicle cabin, comprising a compressor (14), a condenser (15), an evaporator (16), a control unit (19) and a ventilation assembly (18) with a single motor (24) capable of promoting easy installation and autonomous functioning for both cooling and heating the inside of a cabin.

16 Claims, 5 Drawing Sheets

(56) References Cited

U.S. PATENT DOCUMENTS

| | | | | |
|---|---|---|---|---|
| 4,641,502 | A | * | 2/1987 | Aldrich et al. .................. 62/244 |
| 4,672,818 | A | * | 6/1987 | Roth ............................... 62/239 |
| 4,709,623 | A | * | 12/1987 | Roth et al. .................... 454/292 |
| 5,390,728 | A | * | 2/1995 | Ban .............................. 165/204 |
| 5,605,055 | A | * | 2/1997 | Salgado ......................... 62/244 |
| 5,791,156 | A | * | 8/1998 | Strautman et al. .............. 62/244 |
| 6,295,826 | B1 | * | 10/2001 | Lee ................................ 62/244 |
| 6,357,249 | B1 | * | 3/2002 | Robinson et al. ............... 62/285 |
| 6,718,786 | B1 | * | 4/2004 | Hille et al. ..................... 62/279 |
| 6,718,787 | B1 | * | 4/2004 | Hille et al. ..................... 62/279 |
| 6,889,762 | B2 | | 5/2005 | Zeigler et al. |
| 7,171,822 | B2 | | 2/2007 | Allen et al. |
| 2005/0048902 | A1 | * | 3/2005 | Lindsey et al. .................. 454/93 |
| 2005/0252758 | A1 | * | 11/2005 | Schmidt et al. ............... 200/310 |
| 2006/0102333 | A1 | | 5/2006 | Zeigler et al. |
| 2006/0151163 | A1 | | 7/2006 | Zeigler et al. |
| 2006/0151164 | A1 | | 7/2006 | Zeigler et al. |
| 2008/0314072 | A1 | * | 12/2008 | Plank et al. .................... 62/498 |

OTHER PUBLICATIONS

Written Opinion of the International Searching Authority mailed Jan. 27, 2009 for International application No. PCT/BR2008/000330.

International Preliminary Report on Patentability completed Nov. 4, 2009 for International application No. PCT/BR2008/000330.

* cited by examiner

VEHICLE-CABIN AIR-CONDITIONING SYSTEM AND A MODULE CONTAINING THE SYSTEM

This application claims priority of Brazilian patent case No. PI0705494-7 filed on Oct. 30, 2007 the disclosure thereof being hereby incorporated by reference.

The present invention relates to a vehicle-cabin air-conditioning system, which is compact, autonomous and of low energy consumption, capable of being installed with a minimum level of adaptation in the vehicle.

DESCRIPTION OF THE PRIOR ART

The air-conditioning systems that are usually employed on automotive vehicle, as for example trucks, comprise a cooling module mounted on the vehicle cowling, being provided with the components necessary for their functioning. The installation of this type of system requires a number of adaptations, thus being laborious.

An option for the vehicle air-conditioning is the utilization of air-conditioners with a compressor connected to the vehicle engine through a pulley and an electromagnetic clutch. Whenever the driver wishes to turn on the air-conditioning system, this clutch is actuated, permitting transmission of the motion from the engine to the compressor, thus causing the cooling fluid to circulate through the cooling circuit installed on the vehicle.

This type of system is much used on automotive vehicles, but has the drawback that, as a rule, it requires the vehicle engine to be in operation. Even in the situations in which the vehicle is motionless, it becomes necessary to keep the engine functioning, so that the cabin will be air-conditioned, a fact that generates a considerable consumption of fuel, in addition to the air pollution which this procedure cause.

With a view to overcome these problems, a number of solutions have been developed so as to enable the functioning of the air-conditioner when the engine is off.

Document US2006/0102333 discloses an air-conditioning system for road or track vehicles which provides a method of operation while the engine is working and even when the vehicle engine is off, and for this purpose the air-conditioning system is controlled by a particular motor.

A prior-art solution is also known from document U.S. Pat. No. 7,171,822, which discloses a vehicle air-conditioning system provided with a first and a second system. The first system is adapted for the conditions of the vehicle cabin and operates fed by the vehicle engine when the latter is functioning. The second system is adapted for the conditions of the dormitory compartment of the vehicle and is capable of remaining in operation when the vehicle engine is off, the first system operating independently of the second system. One can conclude that the second system operates by means of electric power and can be arranged at the external portion of the vehicle, a condition that requires bores to be made in the cabin for passage of tubing.

Document US2006/0151164 makes reference to a heating and air-conditioning system for vehicles, particularly for road and track vehicles, capable of remaining in operation even with the engine off, by means of a storage battery independent of the vehicle battery.

As can be seen, the solutions found until now to reduce the volume of the air-conditioning systems for vehicle cabins entail difficulties with regard to their feed and configuration. It is necessary to arrange some of the circuit components outside the air-conditioning module, so as to maintain the same air-conditioning capacity.

Therefore, one points out the need to provide the market with an air-conditioning system that guarantees a simple installation, without external connections of the cooling system, where all the components are within a module that is compact and enables the functioning thereof independently of the functioning of the vehicle engine.

OBJECTIVES OF THE INVENTION

Therefore, it is a first objective of this invention to provide a totally autonomous vehicle-cabin air-conditioning system, which is efficient and compact and enable easy installation, the module of said air-conditioning system having a constructive arrangement capable of comprising a compressor and a ventilation assembly provided with only a motor, so as to minimize the consumption of energy.

In accordance with the first objective, a second objective is to build a vehicle-cabin air-conditioning system that guarantee its functioning independently of the operation of the vehicle engine.

It is further a third objective is to provide a vehicle-cabin air-conditioning module capable of providing both heating and cooling of the vehicle cabin.

BRIEF DESCRIPTION OF THE INVENTION

The present patent application relates to a solution of a vehicle-cabin air-conditioning system comprising a compressor, a control unit, a condenser, a discharge tube of the compressor, an evaporator and a ventilation assembly, the arrangement of the evaporator, condenser and ventilation assembly provided with only one motor is such that it simultaneously enables to dissipate heat in the condenser and admitting heat into the evaporator, and the water condensed in the evaporator is evaporated by the contact with the discharge tube of the compressor.

The present application also relates to a vehicle-cabin air-conditioning system comprising a chassis provided with air-collection bores arranged peripherally on the chassis, the chassis comprising at least one air inlet and at least one air outlet for exchanging air with the internal environment of the cabin, the chassis portion facing outwards of the cabin is provided with an external cover, a compressor, a control unit, a condenser, a discharge tube of the compressor, a suction line forming to a heat exchanger with a capillary tube, an evaporator and a ventilation assembly. The disposition of the evaporator, the condenser and of the ventilation assembly having only one motor is such that it simultaneously enables dissipation of heat in the condenser and admission of heat into the evaporator, the water condensed in the evaporator is drained into a water reservoir, and the ventilation assembly is partly and fluidly connected with the air tubing.

The present application also relates to a vehicle-cabin air-conditioning comprising an external portion and an internal portion with respect to the cabin, which are isolated from each other by means of the cabin roof, the internal portion comprising an air tubing, an internal cover and a console, the external portion comprising a chassis, a sealing, a cooling system and an external cover, the console being provided with at least one air directioning means, a control panel, an internal air filter and at least one internal air inlet, the cooling system rests on the chassis, the chassis comprising at least one air inlet and at least one air outlet for air exchange with the internal environment of the cabin. The cooling system comprises a compressor, a control unit, a condenser, a compressor discharge tube, an evaporator and a ventilation assembly, so that the arrangement of evaporator, condenser and ventilation assembly having only one motor will simultaneously enable dissipation of heat in the condenser and admission of heat in the evaporator, and the air cooled by the evaporator circulates through the air outlet of the chassis, through the air ventilation for air-conditioning the cabin by means of the air directioning means.

BRIEF DESCRIPTION OF THE DRAWINGS

The present invention will now be described in greater detail with reference to an embodiment represented in the drawings. The figures show.

DETAILED DESCRIPTION OF THE FIGURES

In a preferred, but not compulsory, embodiment, the air-conditioning system 1 of the present invention will now be described in detail.

The present invention relates to a compact air-conditioning system 1 to be applied in vehicle cabins, such as cabins of trucks, buses, amusement vehicles like trailers or motor homes, armored cars or agricultural machines or any other vehicle having a closed cabin, the inside of which can be air-conditioned.

The great innovation in this air-conditioning system 1 is the fact that the components, high-pressure and low-pressure assembly, are installed inside the module, without the need for complicated installations that need boring for the passage of tubing. It only becomes necessary to connect the system to a battery by means of an electric wire, in order to supply energy to the air-conditioning system 1.

Figure 1:
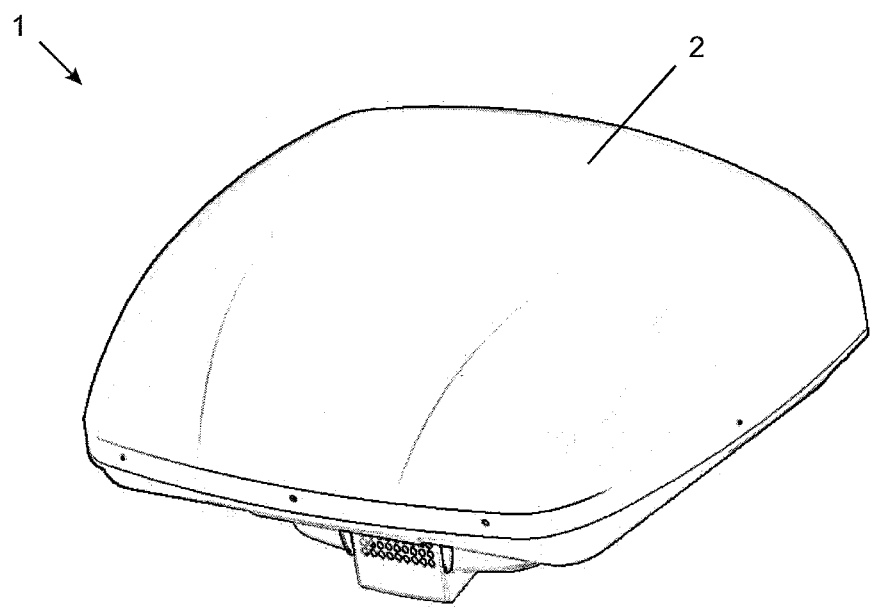
FIG. 1 is a perspective view of the air-conditioning module of the present invention.
Figure 2:
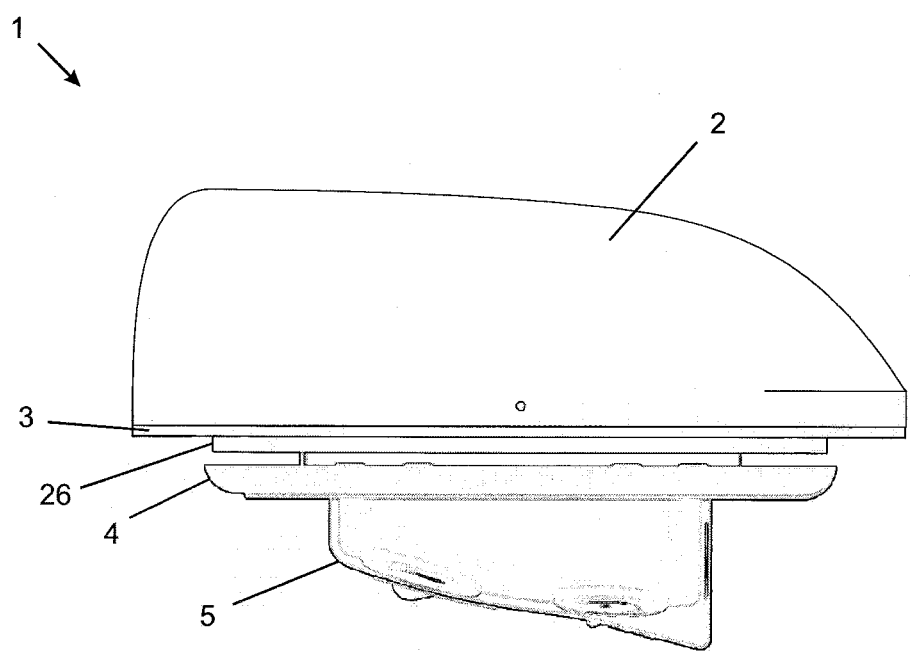
FIG. 2 is a side view of the air-conditioning module of the present invention.

In a preferred configuration, FIG. 1 illustrates a perspective view of the air-conditioning system 1 having an external cover 2. As can be seen more easily in FIG. 2, the air-conditioning system 1 comprises two portions. After installation of the air-conditioning system, the module presents an external portion and an internal portion with respect to the cabin.

The external portion is comprised by an external cover 2, which has the shape of a wedge with low aerodynamic trailing, a chassis 3 and a sealing 26, which serves to support the air-conditioning system 1 on the surface receiving it, thus minimizing the transmission of vibration and preventing escape of conditioned air out of the cabin. The cooling system 21 is housed on the chassis 3 and is protected against the external environment by the external cover 2.

Figure 3:
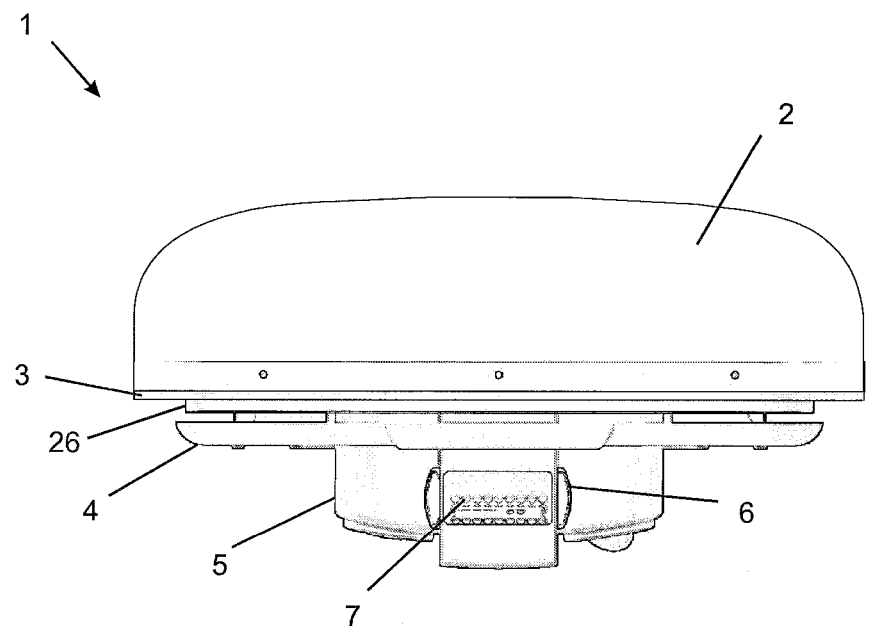
FIG. 3 is a back view of the air-conditioning module of the present invention.
Figure 4:
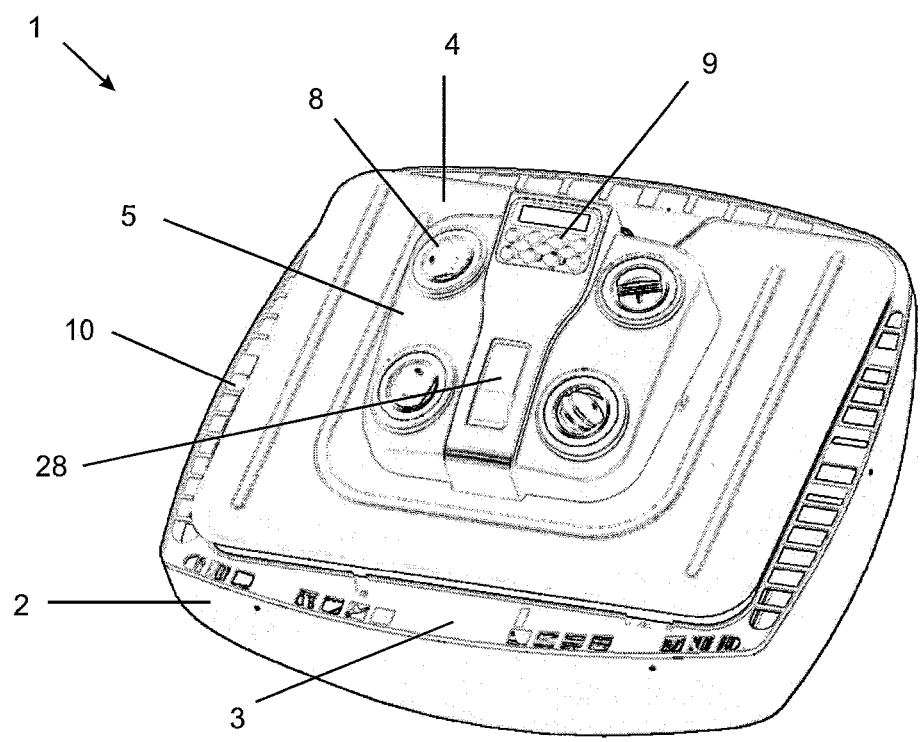
FIG. 4 is a perspective view of the internal part of the air-conditioning module of the present invention.

The internal portion comprises an internal cover 4, which aims at providing the module with a finish and a console 5 that, as illustrated in FIGS. 3 and 4, houses various components.

The console 5 is, therefore, the interface of the air-conditioning system 1 with its user, being provided with air directioning means 8 to provide directioned air-conditioning according to the taste of the user. These air directioning means 8 enable one to sent conditioned air in any desired direction.

On the console 5 there is also a control panel 9, preferably an electronic one, provided optionally with a screen, enabling the user to turn on/off the air-conditioning system 1, select the functioning speed, turn on/off a reading light 28 also present on the console 5, stipulate a defined temperature or even program the air-conditioning system to turn on/off at a pre-determined time. Additionally, the control panel 9 can control other accessories like a radio, a GPS system with a monitor, a live-voice telephone system and a ham radio station, among others. All the functions of the module can also be controlled by remote control. Due to the height of the cabins of modern trucks and to the compact size of the control panel 9, it becomes unfeasible to locate all these components together on the system console.

At the back part of the console 5, that is, at the portion that is substantially adjacent the control panel 9, there is an internal air inlet 7 and an internal air filter 6 for filtering the impurities existing in the cabin environment. In a preferred, but not compulsory, embodiment, the internal air filter 6 is constituted by a plastic screen with projections from both sides of the internal air inlet 7, which provide rigidity.

FIG. 4 further illustrates the chassis 3 having air collecting bores 10, which, after the installation of the air-conditioning system 1, will be arranged on the external side of the cabin.

Figure 5:
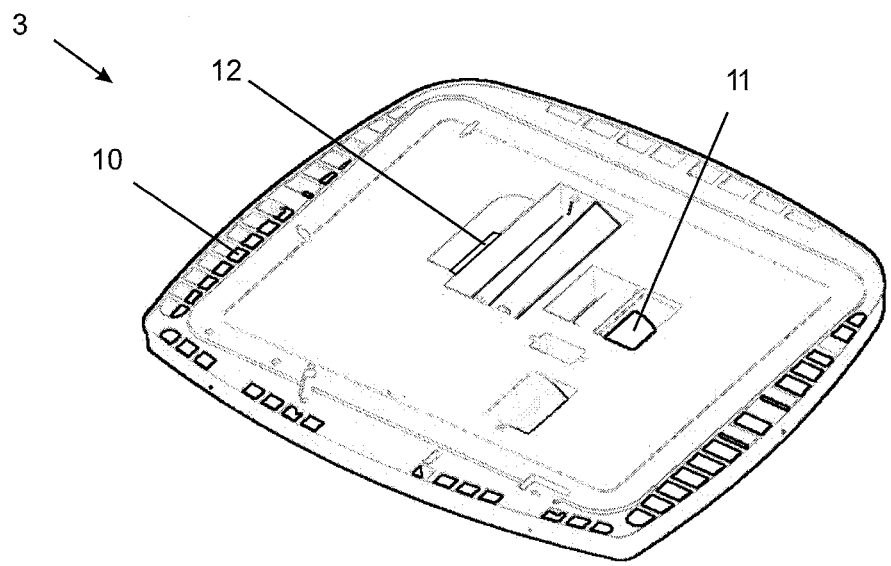
FIG. 5 is a perspective view of the chassis, where the air tubing of the air-conditioning module of the present invention will be installed.

FIG. 5 illustrates the chassis 3 having said air collecting bores 10, as well as the cabin air outlet 11, from where the conditioned air comes through the cooling system 21, and a cabin air inlet 12 for admission of air coming from the internal air inlet 7 of the cooling system 21.

The chassis 3 is a fundamental piece of the air-conditioning system 1, since all the components that integrate the system are mounted on it. This chassis 3 is preferably, but not compulsorily, provided with recesses and notches made during the manufacturing process and that enable fixation of the components. Some recesses and notches of the chassis 3 are pre-bores that enable the installation of the system in a varied range of vehicle models, thus being easily installed at the truck hatchway.

Figure 6:
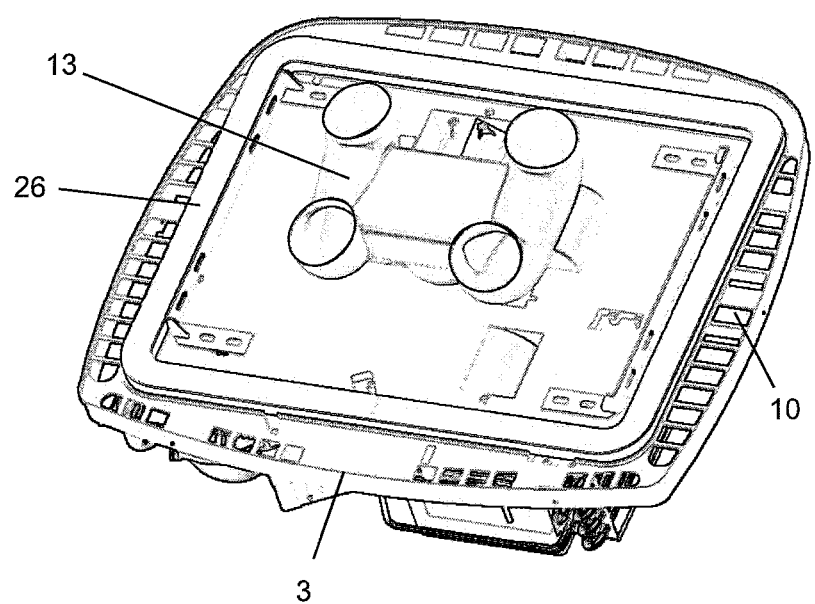
FIG. 6 is a perspective view of the chassis with partial installation of the air tubing.

FIG. 6 illustrates said chassis 3 with the sealing 26 already installed, as well as the air-tubing elements 13, which enable transmission of the conditioned air that flows through the cabin air outlet 11 existing on the chassis 3 to the air directioning means 8 existing on the console 5.

Figure 7:
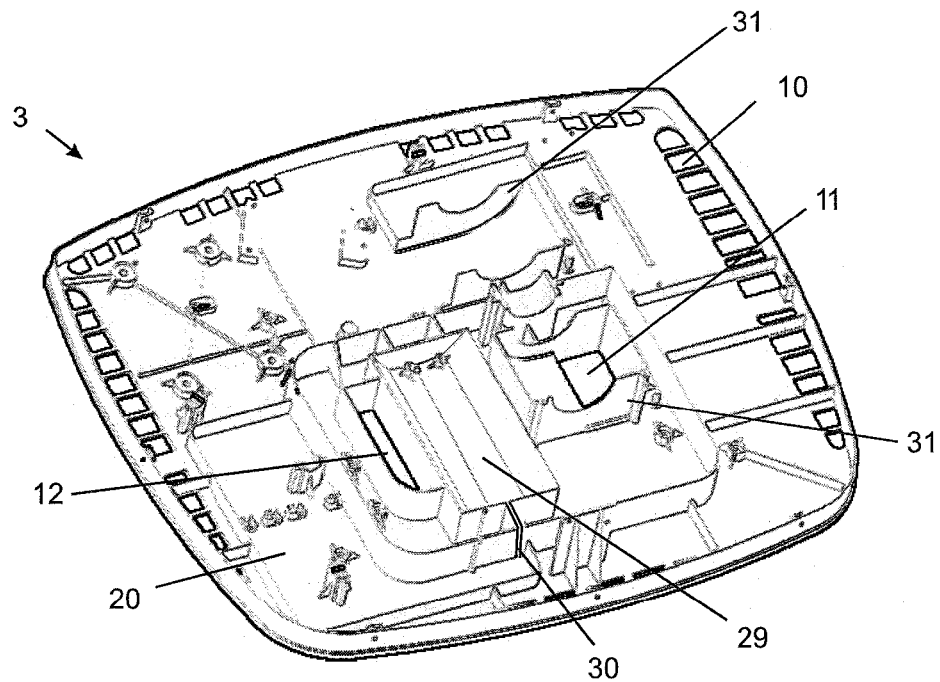
FIG. 7 is a perspective view of the chassis, where the cooling system of the cooling module of the present invention will be installed.

FIG. 7 illustrates the preferred, but not compulsory, configuration of the chassis 3. In this figure it is possible to identify the seating tray 29 of the evaporator 16 between the cabin air inlet 12 and the cabin air outlet 11 of the chassis 3. This tray 29 has an inclination and has been designed so as to route the water from condensation in the evaporator 16 to a reservoir 20 through the drain 30, for the purpose of storing it, thus preventing the water from flowing into the cabin to be air-conditioned. The walls of the water reservoir 20 can be resized according to the need for prevention.

Figure 8:
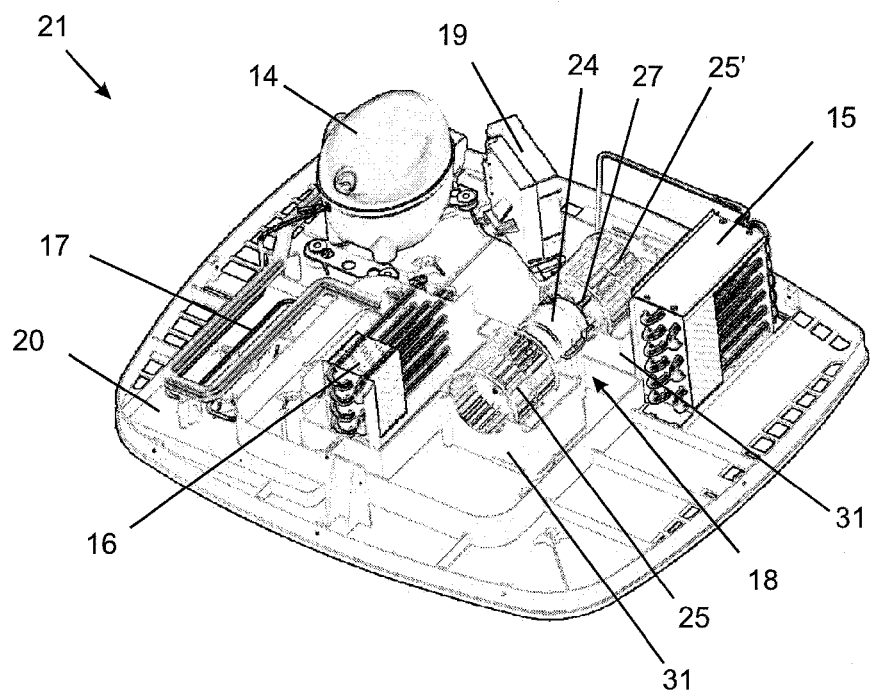
FIG. 8 is a perspective view of the chassis with the cooling system installed.

In FIG. 8 one can identify the cooling system 21 mounted on the chassis 3. This cooling system 21 comprises a compressor 14, a condenser 15, an expansion valve or capillary tube (not shown) and an evaporator 16 mounted in series through discharge tubes to form a cooling closed circuit. A ventilation assembly 18 and a control unit 19, which may preferably, but not compulsorily, be a frequency converter, are also mounted on the chassis 3.

The cooling system 21 works by mechanical vapor compression and preferably, but not compulsorily, comprises a hermetical varying capacity compressor 14 (VCC), and the cooling system 21 may have, for instance, the capacity of 1800 Btu/h The cooling fluid, after coming out of the compressor 14, flows through the discharge tube of the compression 17 towards the condenser 15. It should be noted that the discharge tube of the compressor 17 is housed in the water reservoir 20 right after the outlet of the compressor 14.

Due to the arrangement of the discharge tube of the compressor 17, the existence of water in this reservoir, coming from the process already explained, acts as a pre-condenser, contributing to cool the cooling fluid. Since the discharge tube of the compressor 17 is at a sufficiently higher temperature than the temperature of the water, for example, about 70° C., the heat emanated contributes to the evaporation of the water. With this solution, one also prevents the need to use a hose for draining the water from the reservoir or even a pump to take the water out of the reservoir. In the event that the atmospheric conditions cause an excessive increase in the amount of water, the chassis 3 already foresees a configuration that prevents the water from overflowing through the air-collection bores 10 out of the module, thus preventing the components from getting wet.

The innovatory ventilation assembly 18 comprises a compact motor 24 having a through axle 27 and two cylindrical ventilators 25, 25'. In a preferred, but not compulsorily, configuration, the ventilators 25, 25' are arranged on the through axle 27 at both sides of the motor 24 and may also be arranged at only one side of the motor 24, according to the need to make use of the available space. This innovatory configuration of the ventilation system 18 enables reduction in the consumption of energy, by virtue of the utilization of only one motor 24 capable of actuating the two ventilators 25, 25', thus reducing the volume of the air-condition system 1.

According to FIG. 8, a ventilator 25 is mounted for the evaporator 16 and another ventilator 25' is mounted for the evaporator 16, the evaporator 16 and the condenser 15 being arranged parallel to each other and opposite the motor 24. In this way, the arrangement of the evaporator 16, of the condenser 15 and of the ventilation assembly 18 having only one motor 24 is such that it simultaneously enables the dissipation of heat in the condenser 15 and the admission of heat into the evaporator 16.

The technology of these ventilators 25, 25' requires that they be involved by closing evolutes 31 so as to enclose its whole perimeter. These closing evolutes 31 are divided into two halves, one portion being defined by the chassis 3 and the other portion being defined by the cold box 23 represented in FIG. 9. This cold box 23 may be built from any isolating material, such as EPS or another material deemed to be suitable. In an alternative embodiment, the cold box 23 may be integrated in the external cover 2.

Figure 9:
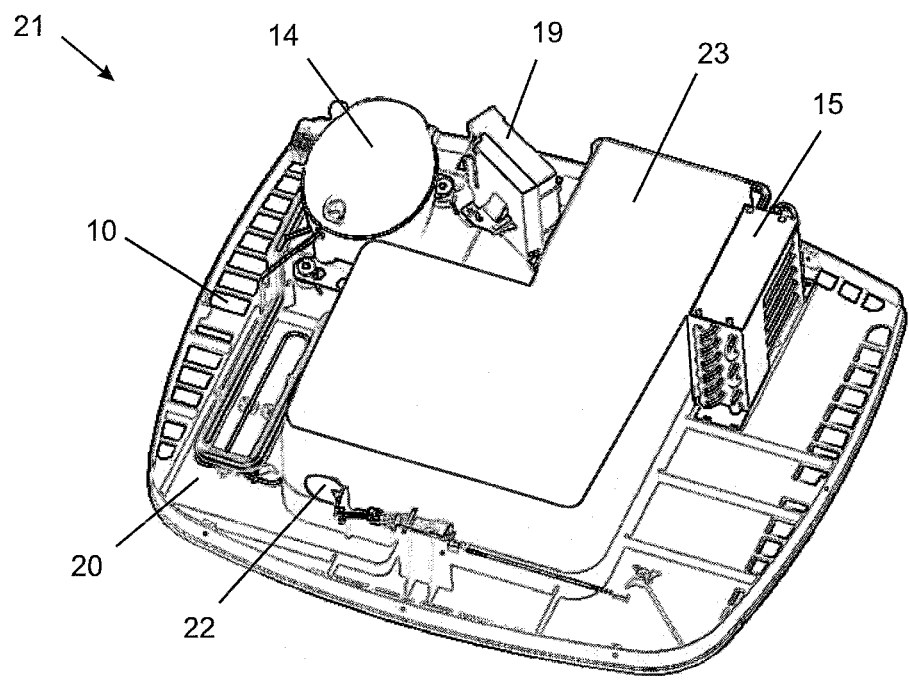
FIG. 9 is a perspective view of the chassis with the cooling system and the cold box installed.

The cold box 23 is mounted on the chassis 3 and has the function of providing air inlet and outlet for both the compressor 14 and the condenser 15, besides isolating the cold zone from the hot one, that is to say, promoting the isolation of the ventilator 25 of the evaporator 16 from the ventilator 25' of the condenser 15. The cold box 23, as illustrated in FIG. 9, covers, in a first portion, the assembly of evaporator 16 and respective ventilator 25 and, in a second portion, the ventilator 25 of the condenser.

Once the closing evolutes 31 of the ventilators 25, 25' have been formed throughout the perimeter, the functioning of the air flows takes place as follows. In operation, the admission of air in the ventilators 25, 25' takes place through the cylinder top, the air being sent to the cylinder in a tangential manner, whereby a low-pressure region is formed in the volume created by the cold box 23 with the chassis 3.

Summarizing, the cooling system 21 functions as follows. The cooling fluid is compressed in the compressor 14 and then follows through the discharge tube of the compressor 17 to the condenser 15. After coming out of the compressor 14, it comes into contact with the water to evaporate present in the water reservoir 20, thus becoming a pre-condenser. Once the fluid reaches the condenser 15, it undergoes a cooling due to the flow of air from the movement of the ventilator 25', this flow of air taking place as follows. The air passes though the condenser 15, gets into the ventilator 25' of the condenser 15 and comes out in the direction of the control unit 19 and of the compressor 14, so as to form a stream of air that promotes the beneficial cooling of the compressor 14 and of the control unit 19.

The cooling fluid comes out of the condenser 15 and after passing through the expansion valve and the capillary tube (not shown) reaches the evaporator 16, thus withdrawing the heat from the environment. As described, the evaporator 16 and the cold box 23 form a cold region. The ventilator 25 of the evaporator 16 collects the air coming from the cabin, causing it to pass through the cabin air inlet 12 and right afterwards through the evaporator 16, and comes out through the cabin air outlet 11 towards the cabin to be air-conditioned. The cooling fluid, after passing through the evaporator 16, returns to the compressor through a suction tube.

The air-conditioning system 1 is further provided with an actuator 22 connected to the cold box 23 so as to enable the latter to open and close a bore located in its side portion. In this way, the actuator 22 enables one to move the cover of the bore of the cold box 23 selectively between an open position and a closed position, the closed position permitting only the recirculation of the cabin air through the internal air inlet 7, and the open position permitting the circulation of the cabin air simultaneously with the air collected in the external environment through the air collection bores 10.

This bore communicates with the cabin air inlet side 12 of the evaporator 16 (low-pressure side of the inside of the isolation), enabling the air of the external environment to be mixed with the air that is recirculating within the cabin.

The position of the actuator 22 can be controlled by the user by means of a button existing on the console 5 or by remote control. The actuator 22 has a linear movement and its actuation is preferably electrical.

In order to filter the air coming from the outside, the bore existing in the cold box 3 in the region of the actuator 22 is provided with a filter, a filter being also foreseen in the air collecting bores 10 for the purpose of keeping the internal zone free from dusts, insects and other dirt.

With a view to minimize the entry of dirt or water into the air-conditioning module, the chassis 3, after installation, remains arranged at a substantially reduced height, of about 30 mm to 40 mm from the vehicle roof.

In an alternative configuration, the air-conditioning system 1 enables the functioning in reverse cycle, so as to provide heating for the cabin. In this alternative configuration, the condenser 15 seating region is provided with a tray for collecting water formed therein.

This air-conditioning system 1 thus enables mounting on a single base, enabling one to install the module on vehicle cabins, without the need to make bores in the bodywork, that is to say, one can use only the pre-existing vehicle hatchway, making the installation very simple and without impacts on the original vehicle configuration.

Alternatively, the air-conditioning system 1, instead of being mounted in the horizontal position, may be mounted in a vertical position, and can thus be easily mounted, for instance, on a window of a trailer. This type of installation entails an adaptation of the position of the compressor 14, since the latter should be in the vertical position in order to work properly.

Thus, this invention provides an air-conditioning system capable of heating or cooling the internal environment of a cabin, guaranteeing simplified installation, simple manufacture, by virtue of the reduced number of components, reduced maintenance and low weight, a fundamental requirement for this type of application.

One should understand that the scope of the present invention embraces other possible variations, besides the embodiment described and illustrated herein. So, the invention will be limited only by the contents of the accompanying claims, which include the possible equivalents.

The invention claimed is:

1. A vehicle-cabin air-conditioning system, comprising a chassis having air-collection bores arranged peripherally in the chassis,
    the chassis comprising at least one cabin air inlet and at least one cabin air outlet for exchanging air with the inside of the cabin, wherein a chassis portion facing outwardly of the cabin comprises an external cover, a compressor, a control unit, a condenser, a compressor discharge tube, an evaporator and a ventilation assembly,
    the ventilation assembly comprising only one motor, the motor comprising a through axle, the through axle comprising condenser and evaporator ventilators respectively arranged at opposite ends of the through axle such that dissipation of heat from the condenser and admission of heat to the evaporator occur simultaneously by means of the condenser ventilator and the evaporator ventilator, respectively,
    the chassis comprising a cold box connected thereto, the cold box comprising a first portion and a second portion,
    the first portion of the cold box covering the evaporator and the evaporator ventilator and the second portion of the cold box covering the condenser ventilator,
    the first portion of the cold box defining a cold zone and the second portion of the cold box defining a hot zone, the cold zone and the hot zone being isolated from each other,
    the cold box providing an air inlet and outlet for the compressor, the control unit and the condenser, the air inlet receiving air from the condenser, the air being streamed by the condenser ventilator to the air outlet, such that a stream of air from the condenser is formed in the direction of the compressor and in the direction of the control unit, wherein:
    the ventilation assembly is fluidly connected to an air tubing through the cabin air outlet of the chassis which enables transmission of air from the cabin air outlet, the ventilation assembly causing air from the cabin to pass through the cabin air inlet, through the evaporator, and out through the cabin air outlet and into the air tubing towards the cabin to be air-conditioned;
    said vehicle-cabin air-conditioning system further comprising an external and an internal portion with respect to the cabin isolated from each other by the cabin structure where,
    the internal portion comprises the air tubing, an internal cover and a console,
    the external portion comprises the chassis and the external cover,
    the console comprises at least one air-directioning means fluidically connected to the air tubing, a control panel, an internal air filter and at least one internal air inlet,
    the air cooled by the evaporator circulates through the air outlet of the chassis, through the air tubing, and to the air-directioning means for air-conditioning the cabin.

2. A vehicle-cabin air-conditioning system according to claim 1, wherein the ventilators are cylindrical and the exit of air takes place tangentially with respect to the cylinder.

3. A vehicle-cabin air-conditioning system according to claim 1, wherein the evaporator and the condenser are arranged parallel to each other and are located adjacent opposite ends of the through axle.

4. A vehicle-cabin air-conditioning system according to claim 1, wherein the ventilator of the evaporator is fluidly connected to the air tubing through the cabin air outlet of the chassis.

5. A vehicle-cabin air-conditioning system according to claim 1, wherein the vehicle-cabin air-conditioning system enables the collection of air from the outside of the cabin through an actuator, the external air being collected through the air-collection bores arranged peripherally in the chassis.

6. A vehicle-cabin air-conditioning system according to claim 1, wherein the cold box comprises an actuator for moving selectively between an open position and a closed position,
    the closed position permitting only the recirculation of the cabin air through the air inlet,
    the open position permitting the circulation of the cabin air simultaneously with the air collected from the external environment through the air-collection bores.

7. A vehicle-cabin air-conditioning system according to claim 1, wherein the cold box incorporates into the internal part of the cold box two conveniently formed curvilinear surfaces, which constitute a portion of the closing evolute of the ventilators.

8. A vehicle-cabin air-conditioning system according to claim 1, wherein the chassis comprises a water reservoir and a tray to fix the evaporator, the tray being fluidly connected to the water reservoir.

9. A vehicle-cabin air-conditioning system according to claim 8, wherein the water of the reservoir is evaporated by contact with the compressor discharge tube, which is inside the water reservoir.

10. A vehicle-cabin air-conditioning system according to claim 1, wherein the external cover is wedge-shaped with aerodynamic trailing.

11. A vehicle-cabin air-conditioning system according to claim 1, wherein the evaporator and the condenser are arranged parallel to each other and opposite the motor.

12. A vehicle-cabin air-conditioning system according to claim 1, wherein the control panel enables controlling the functions of the system.

13. A vehicle-cabin air-conditioning system according to claim 1, wherein the control panel enables one to turn on/off the cooling system, control the speed of the compressor, of the motor, and actuate other accessories.

14. A vehicle-cabin air-conditioning system according to claim 1, wherein said vehicle-cabin air-conditioning system enables functioning in a reverse cycle.

15. A vehicle-cabin air-conditioning system according to claim 1, wherein said vehicle-cabin air-conditioning system enables functioning in the horizontal or vertical position.

16. A vehicle-cabin air-conditioning system according to claim 1, wherein a remote control enables one to control the functions of the module.

\* \* \* \* \*